No. 785,213. Patented March 21, 1905.

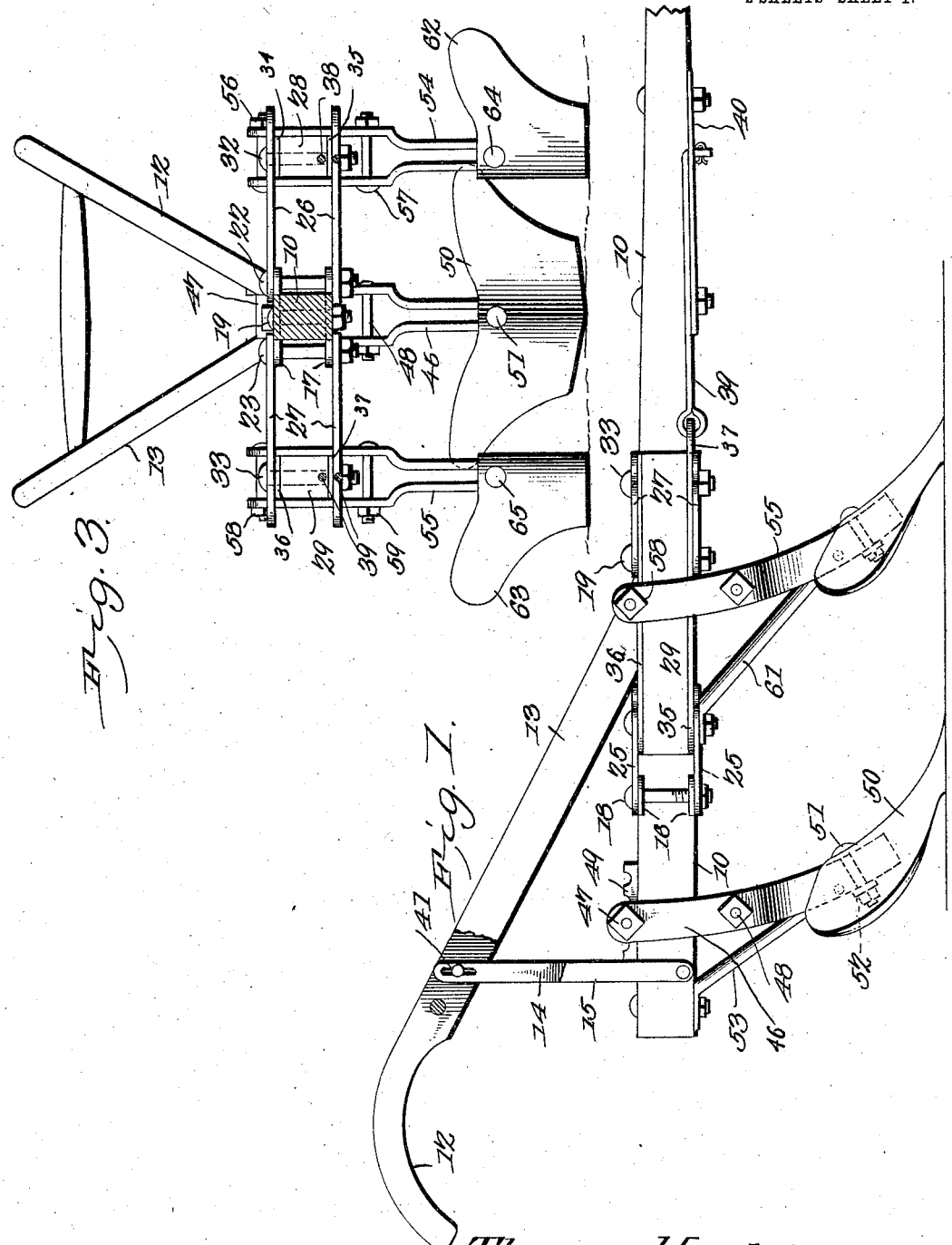

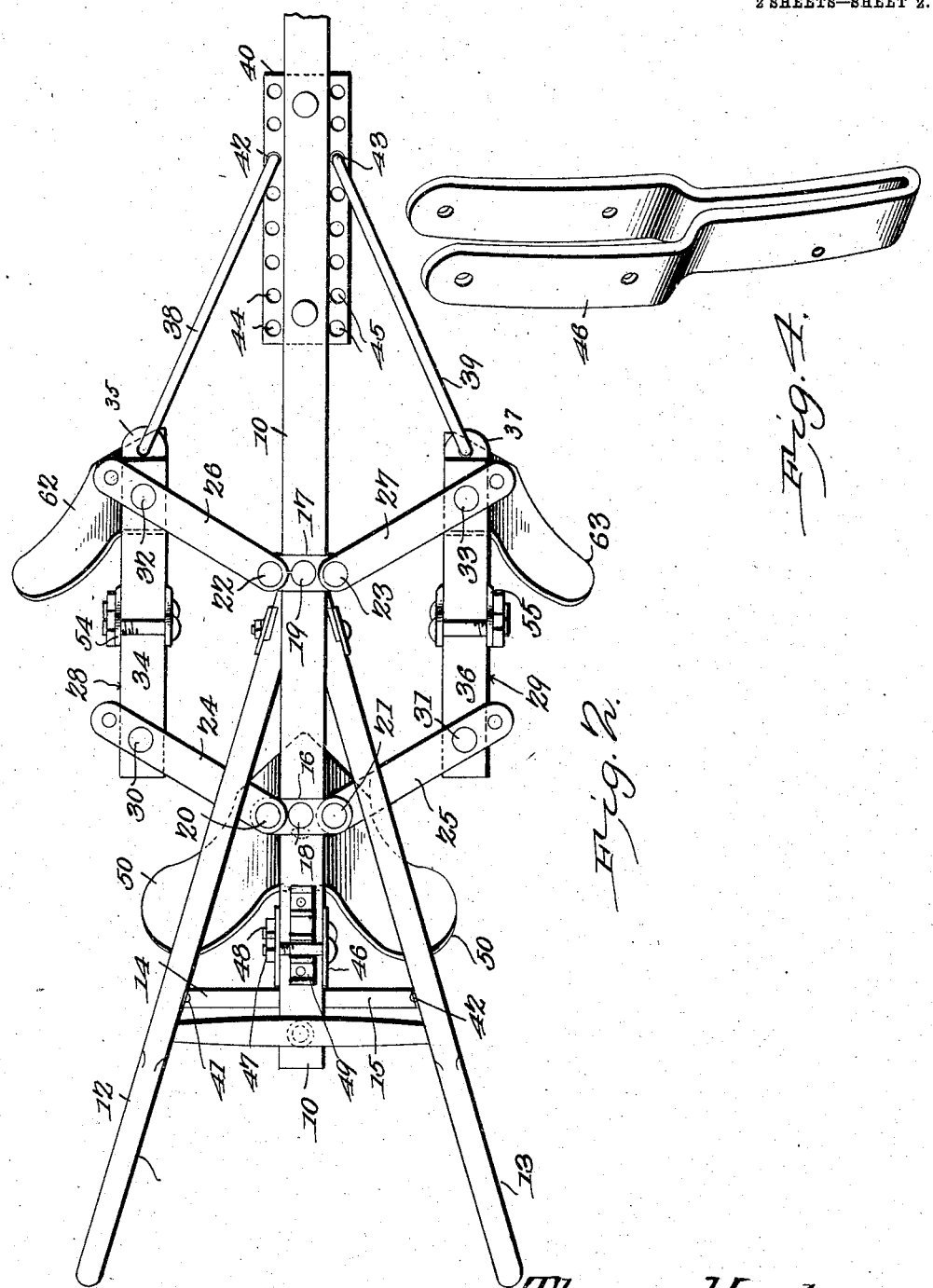

UNITED STATES PATENT OFFICE.

THOMAS HENDERSON, OF BLACKFOOT, TEXAS.

PLOW AND CULTIVATOR.

SPECIFICATION forming part of Letters Patent No. 785,213, dated March 21, 1905.

Application filed May 24, 1904. Serial No. 209,480.

*To all whom it may concern:*

Be it known that I, THOMAS HENDERSON, a citizen of the United States, residing at Blackfoot, in the county of Anderson and State of Texas, have invented a new and useful Plow and Cultivator, of which the following is a specification.

This invention relates to combined shovel-plows and cultivators, and has for its object to improve the construction and increase the scope and efficiency without increasing the weight or expense.

The invention consists, primarily, in a central double-sided or "shovel" form of moldboard and a pair of reversely-disposed or "right and left" moldboards located for operation in advance of and spaced laterally from the central moldboard and preferably independently adjustable laterally relative to the central moldboard.

The invention further consists in certain novel features of construction and arrangement of parts, as hereinafter shown and described, and specifically pointed out in the claim following.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

In the drawings thus employed, Figure 1 is a side elevation of a plow and cultivator constructed in accordance with the invention. Fig. 2 is a plan view of the same. Fig. 3 is a front elevation of the device. Fig. 4 is a perspective view of one of the standards detached.

The improved implement comprises a central beam 10, having at one end the usual clevis (not shown) for the attachment of the draft-animals and the usual handles 12 13 at the other end, the handles preferably adjustable, as by slotted braces 14 15 and clamp-bolts 41 42. Attached to the central beam near its rear portion are transversely-spaced bearings arranged in pairs, as at 16 17, and each pair embedded in opposite sides of the beam and connected thereto by clamp-bolts 18 19. Connected, as by clamp-bolts 20 21 22 23, to the bearings 16 17 are spaced radius-bars arranged in pairs, as at 24 25 26 27, and embracing opposite sides of lateral beams 28 29 and connected thereto movably by pivot-bolts 30 31 32 33. The radius-bars are each provided with a plurality of spaced apertures to provide for the adjustment of the lateral beams relative to the radius-bars.

The lateral beams are provided with wear-plates 34 35 36 37 upon their upper and lower surfaces and the lower wear-plates 35 37 extended forwardly and perforated to receive draft-rods 38 39, the latter terminating in hooks 42 43 for engaging apertures 44 45 in a plate 40, connected to the beam 10 in advance of the lateral beams, a plurality of the apertures being arranged in the plate 40 to provide for the lateral adjustment of the beams 28 29, as hereinafter explained.

Adjustably attached to the central beam 10 in the rear of the bearings 16 is a standard 46 in elongated-U form and embracing the beam from opposite sides and clamped in position by clamp-bolts 47 48. A stop-plate 49 rests upon the beam beneath the upper clamp-bolt 47 to support the standard and prevent longitudinal movement on the beam.

A shovel-plow moldboard 50 is attached to the standard 46, as by clamp-bolt 51, having a rounded or countersunk head engaging the face of the moldboard and a washer and nut 52 bearing upon the rear face of the standard.

A diagonal brace 53 is disposed between the standard 46 and the rear end of the beam 10 to support the standard and prevent displacement under the strains.

The lateral beams 28 29 are provided, respectively, with standards 54 55, similar to the standard 46 and similarly clamped to their respective beams by clamp-bolts 56 57 58 59 and provided with diagonal braces 61.

The moldboards 62 63 for attachment to the standards 54 55 are right and left handed and are reversely disposed and located in advance of the central moldboard and spaced laterally at opposite sides from the same and are connected to their respective standards by clamp-bolts 64 65 in the same manner as the central moldboard is secured to the central standard.

As the implement thus constructed is drawn along the spaced outwardly-operating moldboards 62 63 will open furrows at either side of the center, leaving the central portion only for the double-sided or shovel moldboard to act on. Thus each moldboard acts only on the portion of earth in its own line of draft, and neither moldboard is required to act on the earth once turned over by the others. Another great advantage gained by this arrangement is that when plowing or cultivating in ground containing weeds, stalks, or trash of any kind the advance lateral moldboards remove the greater portion of this material and prevent it from reaching the central moldboard. The central moldboard is thus protected and all danger of clogging the same obviated no matter how much trash may be encountered.

It is obvious that an extended variety of adjustments may be imparted to the different parts to regulate the action of the moldboards to adapt the implement to the various purposes and to the various conditions of the ground or crops upon which it is operated. It is also obvious that the lateral beams 28 29 may be adjusted independently, so that the implement may be set to cause the lateral moldboards to act at a wider distance on one side of the center than on the other, which is very desirable under some conditions of the crops or the ground. The implement may thus be employed either as a cultivator or plow without change in the structure or modifications in any of its parts.

The parts may be of any required size or material; but the beams and handles will generally be of wood and the other parts of steel.

Having thus fully described the invention, what is claimed is—

In a device of the class described, a central or main beam, bearing-plates sunk in transverse recesses in the upper and lower sides of the beam and extending laterally from the same, pairs of radius-bars connected pivotally with said bearing-plates, side beams mounted pivotally between the outer ends of the radius-bars, plates connected with said side beams and having forwardly-extended perforated ends, a plate connected with the beam and having laterally-extending side portions each provided with a plurality of perforations arranged in a longitudinal row, draft-bars provided with hooks at their front ends for adjustable engagement with said rows and perforation, said draft-rods being linked at their rear ends to the perforated extended front ends of the plates connected with the side beams, and blade-carrying standards connected with the main and side beams.

In testimony that I claim the foregoing as my own I have hereto affixed my signature in the presence of two witnesses.

THOMAS HENDERSON.

Witnesses:
J. E. FITZGERALD,
E. GATEWOOD.